United States Patent
Lermer

(10) Patent No.: US 10,433,059 B2
(45) Date of Patent: Oct. 1, 2019

(54) PUBLIC ADDRESS SYSTEM FOR THE SONICATION OF A SONICATION REGION, METHOD FOR THE SONICATION OF A SONICATION REGION AND COMPUTER PROGRAM FOR CARRYING OUT THE METHOD

(71) Applicant: Robert Bosch GmbH, Stuttgart (DE)

(72) Inventor: Franz Lermer, Pilsting-Ganacker (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/102,878

(22) Filed: Aug. 14, 2018

(65) Prior Publication Data
US 2019/0058949 A1 Feb. 21, 2019

(30) Foreign Application Priority Data

Aug. 15, 2017 (DE) ......................... 10 2017 214 181

(51) Int. Cl.
| | |
|---|---|
| *H04R 3/12* | (2006.01) |
| *H04R 1/40* | (2006.01) |
| *H04R 27/00* | (2006.01) |
| *H04R 29/00* | (2006.01) |

(52) U.S. Cl.
CPC ............. *H04R 3/12* (2013.01); *H04R 1/403* (2013.01); *H04R 27/00* (2013.01); *H04R 29/002* (2013.01)

(58) Field of Classification Search
USPC ............ 381/56, 58, 59, 85, 89, 97, 300, 343
See application file for complete search history.

(56) References Cited

U.S. PATENT DOCUMENTS

| 7,002,934 B2 * | 2/2006 | Dolgonos | H04B 7/022 370/328 |
|---|---|---|---|
| 7,436,188 B2 * | 10/2008 | Taenzer | G10K 11/341 324/613 |

FOREIGN PATENT DOCUMENTS

| EP | 2286601 | * 8/2011 | ............. H04R 27/00 |
|---|---|---|---|
| EP | 2286601 | 1/2017 | |

OTHER PUBLICATIONS

International Search Report for Application No. PCT/EP2016/068498 dated Oct. 25, 2016 (English Translation, 2 pages).

* cited by examiner

*Primary Examiner* — Yosef K Laekemariam
(74) *Attorney, Agent, or Firm* — Michael Best & Friedrich LLP

(57) ABSTRACT

Larger regions are often acoustically irradiated with a plurality of loudspeakers. A public address system 1 for the sonication of a sonication region 2 is proposed, wherein the public address system has a multiplicity of loudspeakers 3a, 3b, wherein the loudspeakers 3a, 3b are arranged in the sonication region 2 are designed to output an audio signal based on an input signal 4a, 4b. The public address system has a measuring device 5 for the detection of the audio signal at a measurement point 6 in the sonication region 2, wherein the measuring device 5 is designed to determine a propagation time difference $\Delta t_n$ of the audio signals to the measurement point 6 between each of two speakers 3a,b and to provide the propagation time difference $\Delta t_n$ as propagation time difference data.

11 Claims, 3 Drawing Sheets

PUBLIC ADDRESS SYSTEM FOR THE SONICATION OF A SONICATION REGION, METHOD FOR THE SONICATION OF A SONICATION REGION AND COMPUTER PROGRAM FOR CARRYING OUT THE METHOD

BACKGROUND OF THE INVENTION

A public address system for the sonication of a sonication region is proposed. The public address system has a multiplicity of loudspeakers arranged in the sonication region for outputting an input signal as an output signal. The public address system also comprises a measuring device for detecting the audio signal at a measurement point in the sonication region, wherein the measuring device is designed to determine a propagation time difference of the audio signals between each of two loudspeakers to the measurement point and to provide the propagation time difference and as propagation time difference data. The public address system also comprises a delay module, wherein the delay module is designed to add a time delay to the input signals based on the propagation time differences, in order to compensate for the propagation time difference between the audio signals at the measurement point. A method for the sonication of the sonication region and a computer program for the implementation of the method are also proposed.

In professional public address systems a plurality of separate loudspeakers is often used, in particular for different frequency bands. For the sonication of larger areas, in addition to a central loudspeaker system on the stage, further distributed speaker systems are used to achieve a uniform sound distribution throughout the audience area. Because of the different positions of the individual speakers, the distances and therefore the sound propagation times to the sonication region are also different. In order to avoid the audio signals arriving at the listener at different times and generating unwanted effects, the output signals for the loudspeakers closer to the audience area must be delayed. For this purpose, the audio signals are detected by a specialist and the measurement values determined are implemented in the audio system manually.

Document EP 2 286 601 B1, which probably represents the closest prior art, relates to a conference audio system. The conference audio system has a plurality of delegate units, wherein each delegate unit has a delegate loudspeaker and a delegate microphone. The conference audio system also comprises a control element for distributing at least one audio signal from at least one delegate microphone or from another sound source to a plurality of delegate loudspeakers, wherein the plurality of delegate loudspeakers generates a common audio atmosphere. A delay element is designed to add a time delay to the audio signal, wherein the time delay depends on the distance between the position of the delegate microphone or the sound source which generates the audio signal and the individual delegate loudspeaker position. The time delay is added so as to add a direction characteristic or direction property to the common audio atmosphere, which has been generated with the involvement of the generated audio signal.

SUMMARY OF THE INVENTION

In the context of the invention a public address system for the sonication of a sonication region is proposed. In addition, a method for the sonication of a sonication region and a computer program are proposed. Preferred and/or advantageous embodiments of the invention are obtained from the dependent claims, the following description and the attached figures.

According to the invention a public address system for the sonication of a sonication region is proposed. The sonication region is acoustically irradiated in particular with a sound, with music and/or a signal, such as a warning signal. The sonication region can be an outdoor area or an indoor area. In particular, the sonication region is, for example, a stadium, a concert hall, an open-air arena or a train station concourse. In particular, the audio signal is implemented as a sound signal.

The public address system consists of a plurality of loudspeakers, wherein said loudspeakers are arranged in the sonication region. The public address system preferably comprises exactly two loudspeakers or more than two loudspeakers. In particular, it can be provided that the public address system comprises more than ten loudspeakers or more than fifty loudspeakers. The speakers can be trained as passive loudspeakers or as active loudspeakers. In particular, the speakers are subwoofers, mid-range speakers and/or top-range speakers. It may also be provided that a loudspeaker comprises a plurality of individual speakers. The loudspeakers are designed to output an audio signal based on an input signal. The input signal is preferably a digital input signal, or alternatively the input signal is an analogue input signal. For example, the input signal can comprise the audio signal in coded form, wherein the speaker is designed to decode the coded input signal and output it as an audio signal.

The public address system has a measuring device for detecting the audio signal at a measurement point in the sonication region. The measurement point is located in particular at different distances from the speakers. The distance between a speaker and the measuring device is referred to as a propagation path. The measuring device is, in particular, a sound transducer, specifically an electromagnetic sound transducer, an electrodynamic sound transducer, an electrostatic sound transducer, a piezoelectric sound transducer or a piezo-resistive sound transducer. In particular, the measuring device comprises a microphone for detection of the audio signal. The measuring device is designed to determine a propagation time difference of the audio signals between the two loudspeakers to the measurement point. The propagation time difference is based in particular on the different propagation paths. The measuring device is also designed to provide the propagation time difference as propagation time difference data. The propagation time difference is preferably measured in seconds or milliseconds.

The public address system comprises a delay module. The delay module is preferably designed as a computer unit, as a processor, for example a signal processor, or as a microcontroller. The delay module is designed to add a time delay to the input signals based on the propagation time differences, in order to compensate for the propagation time difference between the audio signals at the measurement point. In particular, the delay module is designed to add a different and/or another time delay to the input signals of the loudspeakers for different loudspeakers of the multiplicity of loudspeakers. In particular, it is provided that the propagation time difference between two loudspeakers is added directly to the input signal of the loudspeaker whose audio signal is detected at the measurement point first. In particular, an input signal is time-delayed.

It is provided according to the invention that the delay module is connected to the measuring device via a data link.

In particular, the delay module can also be comprised by the measuring device. The data link between the delay module and measuring device can be a cable connection or a wireless connection, for example, an IR connection or a radio link. The delay module is provided with the propagation time differences via the data link. In particular, the propagation time difference data are provided to the delay module via the data link between the delay module and the measuring device.

It is a consideration of the invention to provide a public address system that is particularly easy to configure and/or adjust. In particular, one consideration is to provide a public address system which does not require a specialist for its configuration, but rather a layperson can also perform this configuration. An additional consideration is to reduce the number of operating steps needed for the configuration of the public address system. Eliminating the manual configuration of the propagation time differences and the measurement of the propagation time differences also allows another source of error to be eliminated.

A possible formulation of the invention provides that the measuring device is designed to determine the propagation time difference based on a measurement of an impulse response of the audio signals in the measuring device. In this case, the audio signal of each individual speaker is measured by means of the measuring device and detected as an impulse response. The measurement of the impulse responses is performed either simultaneously or sequentially. If the measurement of the impulse responses is performed sequentially, the measuring device is designed to buffer the measured impulse responses. The measuring device is designed to detect the intervals between the measured pulses and/or the impulse responses. The intervals between the pulses corresponds in particular to the propagation time differences. This formulation is based on the consideration to provide a public address system which delivers good reliable results for distributed loudspeakers, in particular over large distances.

A further formulation of the invention provides that the measuring device is designed to determine the propagation time difference based on a measurement of a phase angle of the audio signals at the measuring device and/or at the measurement point. In this case it is provided, in particular, to calculate and/or extract the respective phase waveforms from the impulse responses of each speaker. The measuring device is designed specifically to analyse the phase waveforms in defined and/or specifiable frequency ranges, and in particular to detect a phase shift as a phase angle. Based on the phase shifts, the measuring device is designed to determine the propagation time differences. This structure is based on the consideration of providing a public address system, which determines accurate results for the propagation time differences, particularly at low transition frequencies and/or short propagation time differences.

Optionally it is provided that the measuring device is designed to determine the propagation time difference at a plurality of measurement points. In doing so, the measuring device can comprise a multiplicity of sound transducers, such as microphones, that are physically spaced apart, alternatively the measuring device is designed to be placed at different measurement points by a user. The measuring device is designed to provide, from the propagation time differences determined for different measurement points, a mean value of the propagation time differences to the delay module as propagation time difference data. The mean value can be the arithmetic mean, the geometric mean or the root mean square. In particular, the mean value can be a weighted mean value. Alternatively and/or additionally, it is provided that time differences determined for different measurement points are offered to the user, wherein the user can select a value based on his/her experience. This formulation is based on the consideration of adjusting a compensation of the propagation time differences for a larger spatial area.

It is particularly preferable that the public address system comprises a modelling module. The modelling module is preferably a computer unit or a microprocessor. The modelling module comprises a model of the sonication region and comprises the position of the loudspeakers in the sonication region. The model of the sonication region is, in particular, a three-dimensional or a two-dimensional model. It is particularly preferred that the model of the sonication region is a CAD model and can be supplied to the modelling module by a user, for example. The modelling module comprises, for example, a display unit. The display unit is designed to display the model. The modelling module is designed to propose a measurement point and/or a plurality of measurement points to a user based on the model. In this case, the modelling module can select based on information and/or rules the most useful position that the measurement with the measuring device appears. Alternatively and/or in addition, measurement points can be defined in the model by the user. This formulation is based on the consideration of providing a public address system that can also be operated by a layperson and for which no specialist is necessary who has the appropriate knowledge to determine the points at which the measurement of the public address system is particularly useful.

In particular, the display unit can display the model with the proposed measurement point to the user.

Optionally it is provided that the modelling module comprises the model of the sonication region, positions of the loudspeakers in the sonication region and the measurement point. The modelling module comprises in particular an input module. By means of the input module, the user can select and/or define a point in the sonication region. The modelling module is designed to determine the time differences for the specified and/or selected target point in the sonication region such that the propagation time difference at the target point is compensated. The modelling module is preferably designed to extrapolate the propagation time differences determined at a measurement point for a target point. This formulation is based on the consideration of providing a particularly versatile public address system, in which the point at which the propagation time differences are compensated can be determined automatically.

It is particularly preferred that the measuring device comprises rules. In particular, the rules of the measuring device can be deployed and/or defined by a user. The rules comprise, in particular, information on the best way to control loudspeakers sequentially, in pairs and/or in groups, in order to obtain good measurements for the propagation time differences. The measuring device is designed to control the loudspeakers individually, in pairs and/or in groups with the input signal to determine the propagation time differences. For example, the rule can be to activate two speakers one after the other in pairs, for example from left to right, and to measure each propagation time difference between the two speakers. This formulation is based on the consideration of providing a particularly easily adjustable public address system that works in a particularly time-saving manner, since the activation of the different loudspeakers takes place automatically.

In a possible formulation of the invention, the public address system comprises a splitter module for splitting the input signal into a multiplicity of frequency-selected input signals. In particular, the split module is a crossover network. For example, the split module is designed to split the input signal into a low-frequency part, a medium-frequency part and a high-frequency part, wherein the low-frequency part is provided, for example, to subwoofers, the medium-frequency part to mid-range speakers and the high-frequency part to tweeters. The loudspeakers are designed to each output one frequency-selected input signal as an audio signal. In particular, the public address system can comprise a plurality of splitter modules, wherein for example, the splitter modules are installed in the speakers and filter the input signal automatically. It can be provided that the splitter module acts as a frequency filter.

A possible formulation of the invention provides that the public address system has a memory module for storing the measurement points as measurement point data. The measurement point data comprise the coordinates, the position and/or the orientation of the measurement point in the sonication region. In particular, the associated propagation time difference to the respective speaker and/or to all speakers is assigned to the positions, orientations and/or coordinates of the measurement point. This formulation is based on the consideration of providing a public address system which is able to comply with the standard quality management.

Optionally it can be provided that the public address system comprises a learning module. The learning module is, for example, a computer unit or a neural network. The learning module is designed to provide commonly used methods, parameters, positions and/or propagation time differences to a user as a pre-selection. This formulation is based on the consideration of providing a public address system in which a user can configure the public address system quickly and easily.

A further object of the invention is formed by a method for the sonic irradiation of a sonication region. The method provides that an audio signal which is output by loudspeakers is determined at a measurement point. Based on the measured audio signal, a propagation time difference of the audio signals between two loudspeakers to the measurement point is determined. The propagation time differences are provided to a delay module via a data link using data communication techniques. As part of this it is preferably provided that the delay module modifies an input signal of the loudspeakers by means of a time delay such that no propagation time difference occurs between the audio signals at the measurement point.

A further object of the invention is formed by a computer program, wherein the computer program is designed to carry out all steps of the method for the sonic irradiation of the sonication region when the computer program is executed on a data processing system, a computer unit or the public address system.

BRIEF DESCRIPTION OF THE DRAWINGS

Other features, advantages and effects of the invention result from the following description of preferred exemplary embodiments of the invention. These show.

DETAILED DESCRIPTION

Figure 1:
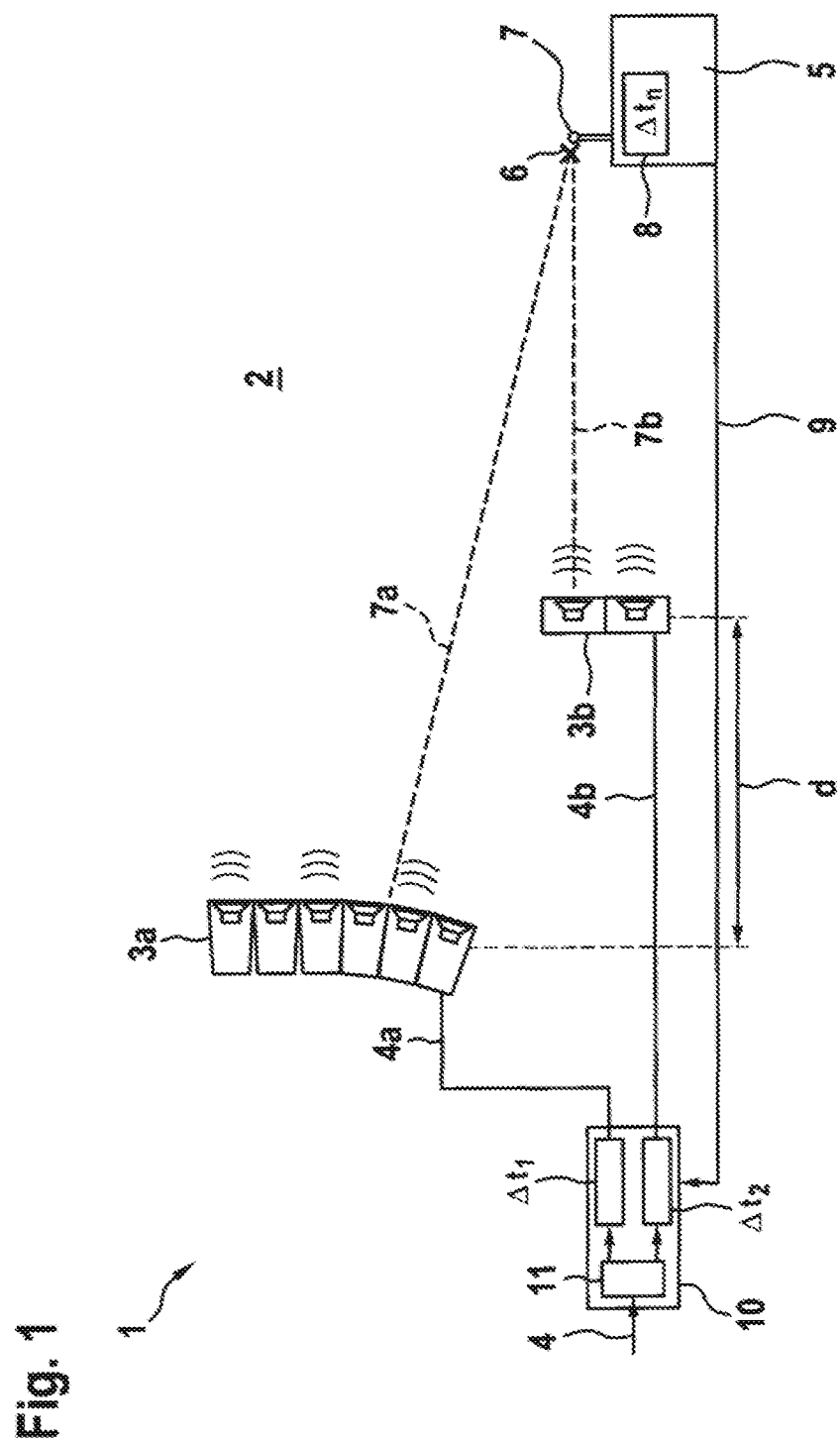
FIG. 1 a schematic view of a public address system as an exemplary embodiment of the invention.

FIG. 1 shows a schematic view of a public address system 1. The public address system 1 is designed to irradiate a sonication region 2 with sound. In particular, the public address system 1 is designed to irradiate the sonication region 2 with an audio signal, wherein the audio signal can be a piece of music, for example. The sonication region is a space covering a large area, such as a stadium or a concert hall.

A multiplicity of loudspeakers 3a and 3b is arranged in the sonication region. The loudspeakers 3a are attached to a ceiling. The loudspeakers 3b are arranged in the floor area of the sonication region 2. The loudspeakers 3a and 3b are designed to output an input signal 4 as an audio signal. For this purpose, the speakers 3a and 3b are each supplied with a frequency-selected input signal 4a and 4b. The frequency-selected input signal 4a is, for example, the input signal 4 frequency-filtered, wherein this frequency-filtered input signal 4a only exhibits frequencies greater than a critical wavelength. The frequency-selected input signal 4b is in particular the frequency-filtered input signal 4, wherein this frequency-selected input signal 4b only exhibits wavelengths smaller than the critical wavelength. The loudspeakers 3a and 3b are designed to convert the input signal 4 and/or the frequency-selected input signals 4a and 4b into an audio signal, in particular into sound.

The speakers 3a and 3b are spaced a distance d apart from each other. A measuring device 5 is arranged in the sonication region 2. The measuring device 5 is designed to measure and/or to detect the audio signal emitted from the loudspeakers 3a and 3b at a measurement point 6. For this purpose the measuring device 5 comprises a sound transducer, such as a microphone 7, at the measurement point 6. Due to the arrangement of the loudspeakers 3a and 3b a distance d apart, the loudspeakers 3a and 3b are different distances away from the measurement point 6. This creates a propagation path 7a for the audio signal emitted from the loudspeaker 3a and a propagation path 7b for the audio signal for the loudspeakers 3b. Due to the finite speed of sound, the audio signals emitted from 3a and 3b arrive at the measurement point 6 at different times. The measuring device 5 is designed to detect the resulting time difference $\Delta t_n$ based on the different propagation paths.

The measurement device 5 is connected to a delay module 10 via a data link 9. The data link 9 is preferably a wired connection, or alternatively the data link 9 can be a wireless connection. The delay module 10 is provided with the propagation time differences $\Delta t_n$ via the data link 9.

The delay module 10 is designed to add a time delay to the input signal 4 and/or the frequency-selected input signals 4a and 4b. In particular, the time delay is the propagation time difference $\Delta t_n$ or is based on the propagation time difference $\Delta t_n$. The delay module 10 is designed to add to the speaker 3b, which is arranged closer to the measurement point 6, the propagation time difference $\Delta t_n$ as a time delay. The delay module 10 then compensates the propagation time difference $\Delta t_n$ of the audio signals from 3a and 3b at the measurement point 6, so that when the time delay is added the audio signals from 3a and 3b arrive at the measurement point 6 at the same time.

The delay module 10 comprises a splitter module 11, wherein the splitter module 11 is designed to split the input signal 4, in particular into the frequency-selected input signal 4a and into the frequency-selected input signal 4b, so that the loudspeaker 3a is only provided with the frequency range of the input signal 4 that is to be emitted by this. In particular, the whole frequency range can also be provided to the loudspeakers 3a and 3b by the splitter module.

Figure 2:
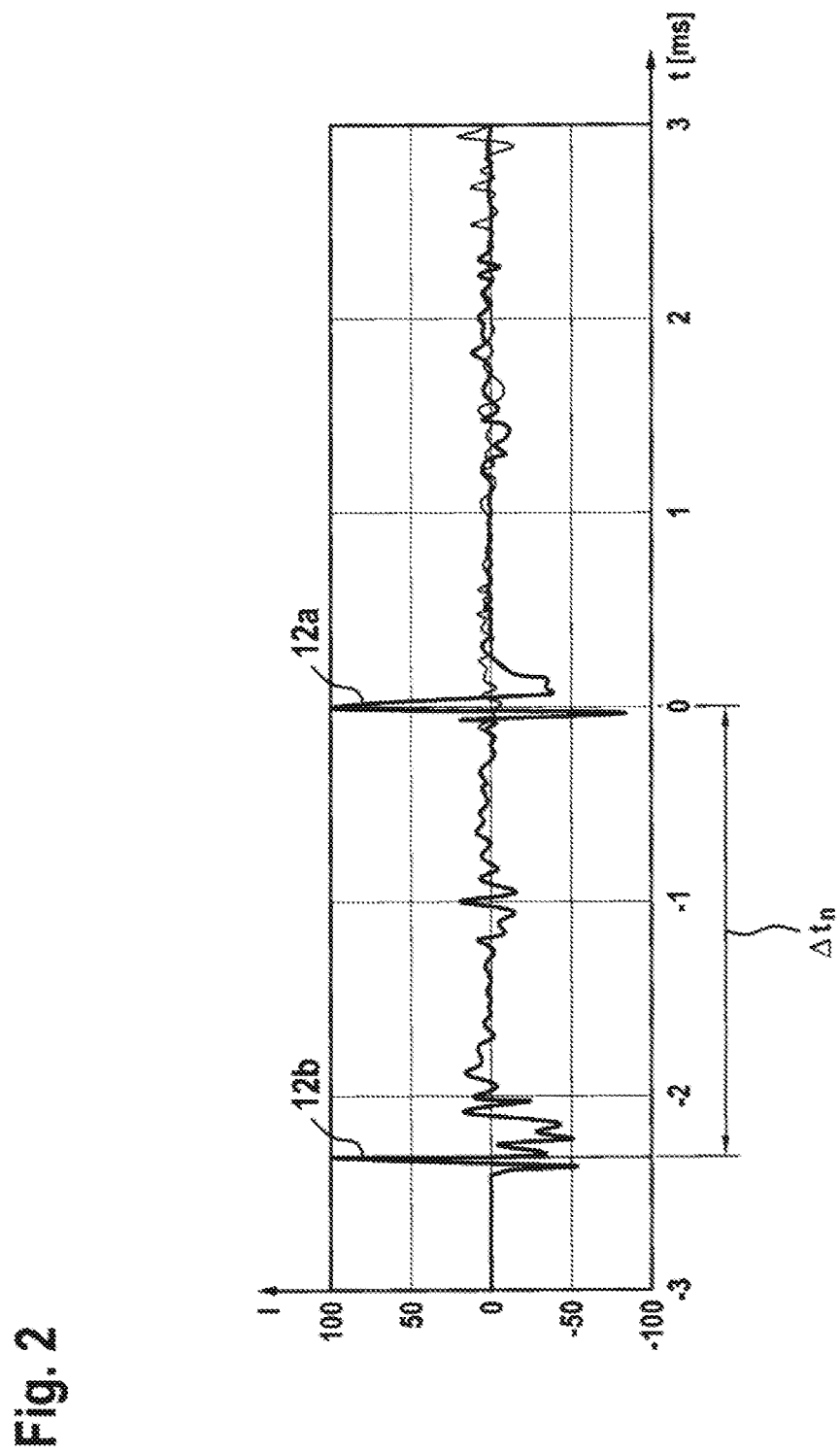
FIG. 2 a frequency spectrum of two detected audio signals.

FIG. 2 shows the schematic view of a measured audio signal emitted from speaker 3a and speaker 3b. The illustration comprises a time axis t and an intensity axis I. In the diagram the audio signal emitted by loudspeaker 3b is shown as impulse response 12b. In addition, the detected audio signal emitted by loudspeaker 3a is shown as impulse response 12a. In the measured impulse response, a characteristic region is sought, here for example, the highest peak of the impulse response 12a and 12b. By measuring the distance between the characteristic region of the impulse responses 12a and 12b, the time difference, in particular the propagation time difference $\Delta t_n$, can be determined.

Figure 3:
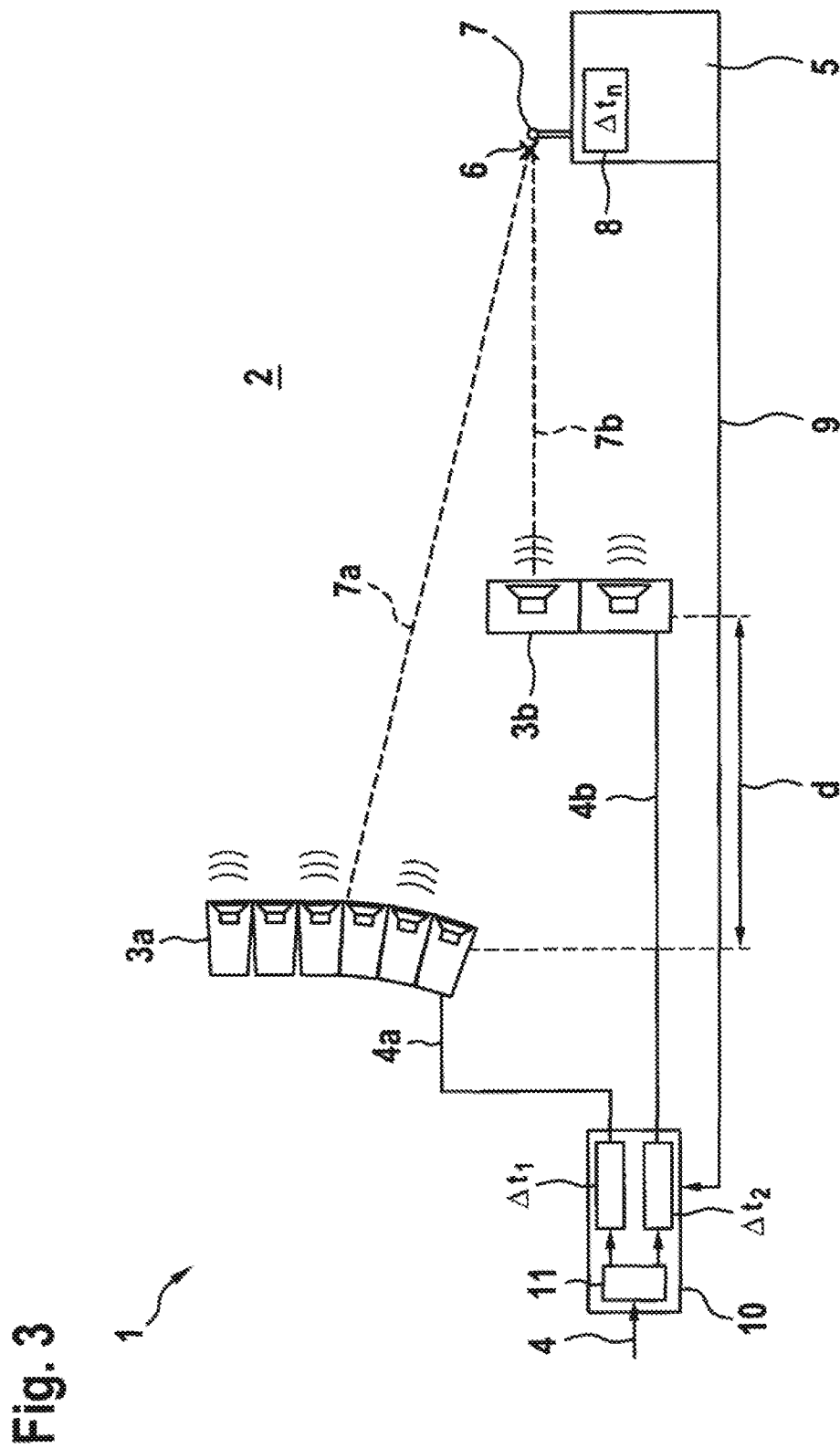
FIG. 3 a schematic view of a public address system as a further exemplary embodiment of the invention.

FIG. 3 shows a schematic view of another public address system 1. The public address system 1 is designed to irradiate the sonication region 2 with sound. An essential difference is that the public address system has two different types of loudspeakers 3a and 3b. The loudspeakers 3a are tweeters and mid-range speakers and are preferably fixed to a ceiling. The loudspeakers 3b are subwoofers and arranged in the floor area of the sonication region 2.

The speakers 3a and 3b are spaced a distance d apart from each other. The measuring device 5 is designed to measure and/or to detect the audio signal emitted from the loudspeakers 3a and 3b at a measurement point 6. The measuring device 5 is designed to detect the time difference $\Delta t_n$ resulting from the different propagation paths.

The delay module 10 comprises the splitter module 11, wherein the splitter module 11 is designed to split the input signal 4, in particular into the frequency-selected input signal 4a and into the frequency-selected input signal 4b, so that the loudspeaker 3a is only provided with the frequency range of the input signal 4 that is to be emitted by this loudspeaker. The splitter module 11 also splits the input signal so that the loudspeaker 4b is only supplied with the frequencies that are lower than the cutoff frequency.

The invention claimed is:

1. A public address system (1) for the sonication of a sonication region (2), the public address system comprising:
   a multiplicity of loudspeakers (3a,b) arranged in the sonication region (2) for outputting an input signal (4a,b) as an audio signal,
   a measuring device (5) for the detection of the audio signal at a measurement point (6) in the sonication region (2), wherein the measuring device (5) is designed to determine a propagation time difference ($\Delta t_n$) of the audio signals between each of two speakers (3a,b) to the measurement point (6) and to provide the propagation time difference ($\Delta t_n$) as propagation time difference data,
   a modelling module, wherein the modelling module comprises a model of the sonication region (2), positions of the loudspeakers (3a,b) in the sonication region (2) and the measurement point (6), wherein by means of the modelling module a user can define a target point in the sonication region (2), a model in the sonication region (2), or both and the modelling module is designed to determine the propagation time differences ($\Delta t_n$) such that the propagation time difference ($\Delta t_n$) at the target point is compensated, and
   a delay module (10), wherein the delay module (10) is designed to add a time delay to the input signals (4a,b) based on the propagation time differences ($\Delta t_n$), in order to compensate for the propagation time difference ($\Delta t_n$) between the audio signals at the measurement point (6),
   wherein
   the delay module (10) is connected to the measuring device (5) via a data link and the propagation time difference data is provided to the delay module (10) via a data link.

2. The public address system (1) according to claim 1, characterized in that the measuring device (5) is designed to determine the propagation time difference ($\Delta t_n$) based on a measurement of an impulse response (12a,b) of the audio signals in the measuring device (5).

3. The public address system (1) according to claim 1, wherein the measuring device (5) is designed to determine the propagation time difference ($\Delta t_n$) based on a measurement of a phase angle of the audio signals at the measuring device (5).

4. The public address system (1) according to claim 1, wherein the measuring device (5) is designed to determine the propagation time difference ($\Delta t_n$) at a plurality of measurement points (6) and to provide a mean value of the propagation time differences ($\Delta t_n$) to the delay module (10) as propagation time difference data.

5. The public address system (1) according to claim 1, characterized by a modelling module, wherein the modelling module comprises a model of the sonication region (2) and positions of the loudspeakers (3a,b) in the sonication region (2), wherein the modelling module is designed to propose a measurement point (6) based on the model to a user.

6. The public address system (1) according to claim 1, wherein the measuring device (5) comprises rules and is designed to control the loudspeakers (3a,b) individually, in groups with the input signal (4a,b) to determine the propagation time differences ($\Delta t_n$).

7. The public address system (1) according to claim 1, characterized by a split module (11) for splitting the input signal (4a,b) into a multiplicity of frequency-selected input signals (4a,b), wherein the loudspeakers are designed (3a,b) to output one frequency-selected input signal (4a,b) each as an audio signal.

8. The public address system (1) according to claim 1, characterized by a memory module for storing the measuring points (6) as measurement point data, wherein the measurement point data comprise the position of the measurement points (6) in the sonication region (2) and the associated propagation time differences ($\Delta t_n$).

9. The public address system (1) according to claim 1, characterized by a learning module, wherein the learning module is designed to provide frequently used methods, parameters, positions, the propagation time differences, or a combination of the same to a user as a pre-selection.

10. A method for the sonication of a sonication region with a public address system (1) according to claim 1, wherein an audio signal output by the loudspeakers (3a, 3b) is determined at a measurement point, wherein based on the measured audio signal, a propagation time difference ($\Delta t_n$) of the audio signals to the measurement point is determined between two speakers (3a, 3b), wherein the propagation time differences ($\Delta t_n$) are provided to a delay module (10) via a data link using data communication.

11. A non-transitory computer-readable medium comprising computer-executable instructions that, when executed by a computer, carry out all steps of the method according to claim 10.

* * * * *